(12) United States Patent
Shih et al.

(10) Patent No.: US 10,018,328 B2
(45) Date of Patent: Jul. 10, 2018

(54) LIGHT EMITTING MODULE AND IMAGE SURVEILLANCE DEVICE THEREOF

(71) Applicant: VIVOTEK INC., New Taipei (TW)

(72) Inventors: Li-Shan Shih, New Taipei (TW);
Yi-Hsin Yeh, New Taipei (TW);
Chih-Chung Wang, New Taipei (TW);
Chih-Hung Chang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 69 days.

(21) Appl. No.: 15/077,914

(22) Filed: Mar. 23, 2016

(65) Prior Publication Data

US 2016/0298823 A1 Oct. 13, 2016

(30) Foreign Application Priority Data

Apr. 10, 2015 (TW) .............................. 104111671 A

(51) Int. Cl.

| | |
|---|---|
| *G03B 15/02* | (2006.01) |
| *F21V 5/00* | (2018.01) |
| *F21V 5/04* | (2006.01) |
| *H04N 5/225* | (2006.01) |
| *G08B 13/196* | (2006.01) |
| *F21V 33/00* | (2006.01) |
| *F21Y 105/10* | (2016.01) |
| *F21Y 115/10* | (2016.01) |

(52) U.S. Cl.
CPC .............. *F21V 5/007* (2013.01); *F21V 5/008* (2013.01); *F21V 5/048* (2013.01); *G08B 13/19619* (2013.01); *G08B 13/19632* (2013.01); *H04N 5/2256* (2013.01); *F21V 33/0076* (2013.01); *F21Y 2105/10* (2016.08); *F21Y 2115/10* (2016.08)

(58) Field of Classification Search
USPC ...... 362/8, 216–217, 227–248, 296, 317–361
See application file for complete search history.

(56) References Cited

U.S. PATENT DOCUMENTS

| | | | | |
|---|---|---|---|---|
| 4,555,168 | A * | 11/1985 | Meier | G03B 35/00 353/7 |
| 2011/0242457 | A1* | 10/2011 | Lee | G02B 6/003 349/63 |
| 2014/0092584 | A1* | 4/2014 | Ono | G02F 1/133611 362/97.1 |

FOREIGN PATENT DOCUMENTS

| | | |
|---|---|---|
| CN | 204145651 U | 2/2015 |
| TW | 200923267 | 6/2009 |

* cited by examiner

*Primary Examiner* — Matthew Mikels
(74) *Attorney, Agent, or Firm* — Winston Hsu

(57) ABSTRACT

A light emitting module includes a lens and first and second light sources aligning with the lens. The lens includes a first biconcave section having a first light-entrance concave surface and a first light-exit concave surface, a second biconcave section having a second light-entrance concave surface and a second light-exit concave surface, and a shared section having a light-exit shared surface. A tangent slope of the shared section where the light-exit shared surface is connected to the first light-exit concave surface is less than a tangent slope of the first biconcave section where the first light-exit concave surface is connected to the light-exit shared surface. A tangent slope of the shared section where the light-exit shared surface is connected to the second light-exit concave surface is larger than a tangent slope of the second biconcave section where the second light-exit concave surface is connected to the light-exit shared surface.

7 Claims, 4 Drawing Sheets

LIGHT EMITTING MODULE AND IMAGE SURVEILLANCE DEVICE THEREOF

BACKGROUND OF THE INVENTION

1. Field of the Invention

The present invention relates to a light emitting module and an image surveillance device thereof, and more specifically, to a light emitting module having a lens which has a first biconcave section and a second biconcave section connected to the first biconcave section via a shared section and an image surveillance device thereof.

2. Description of the Prior Art

In general, an image surveillance device usually has light sources disposed therein for providing auxiliary light to capture clear images when the image surveillance device is operated in a dark environment (e.g. in an indoor environment or in the night). A conventional light emitting design is to dispose convex lenses and biconcave lenses in front of the light sources. The biconcave lenses are disposed alternately and aligned with the light sources respectively. In such a manner, after light emitted by the light sources is focused by the convex lenses, the light emitted by the light sources could be diverged by the biconcave lenses so that a light emitting range of the light sources could cover an image capturing range of the lens module.

However, the aforesaid design may cause a dark band problem due to insufficient brightness of a light intersection region of the two adjacent light sources, so as to influence the image capturing quality of the image surveillance device. Furthermore, alternate disposal of the biconcave lenses could occupy much internal space of the image surveillance device and increase the overall volume of the image surveillance device, so as to be disadvantageous to the thinning design of the image surveillance device.

SUMMARY OF THE INVENTION

The present invention provides a light emitting module. The light emitting module includes a lens, at least one first light source, and at least one second light source. The lens includes a first biconcave section, a second biconcave section, and a shared section. The first biconcave section has a first light-entrance concave surface and a first light-exit concave surface. The second biconcave section has a second light-entrance concave surface and a second light-exit concave surface. The shared section is connected to the first biconcave section and the second biconcave section. The shared section has a light-exit shared surface. A tangent slope of the shared section where the light-exit shared surface is connected to the first light-exit concave surface is less than a tangent slope of the first biconcave section where the first light-exit concave surface is connected to the light-exit shared surface. A tangent slope of the shared section where the light-exit shared surface is connected to the second light-exit concave surface is larger than a tangent slope of the second biconcave section where the second light-exit concave surface is connected to the light-exit shared surface. The at least one first light source is aligned with the lens. Light emitted by the at least one first light source is incident into the first biconcave section and the shared section via the first light-entrance concave surface and is emitted out of the first light-exit concave surface and the light-exit shared surface. The at least one second light source is disposed adjacent to the at least one first light source. The at least one second light source is aligned with the lens. Light emitted by the at least one second light source is incident into the second biconcave section and the shared section via the second light-entrance concave surface and is emitted out of the second light-exit concave surface and the light-exit shared surface.

The present invention further provides an image surveillance device. The image surveillance device includes a casing, at least one lens module, and at least one light emitting module. The at least one lens module is disposed in the casing for capturing images. The at least one light emitting module is disposed in the casing. The at least one light emitting module is disposed adjacent to the at least one lens module for providing light to the at least one lens module when the at least one lens module captures images. The at least one light emitting module includes a lens, at least one first light source, and at least one second light source. The lens includes a first biconcave section, a second biconcave section, and a shared section. The first biconcave section has a first light-entrance concave surface and a first light-exit concave surface. The second biconcave section has a second light-entrance concave surface and a second light-exit concave surface. The shared section is connected to the first biconcave section and the second biconcave section. The shared section has a light-exit shared surface. A tangent slope of the shared section where the light-exit shared surface is connected to the first light-exit concave surface is less than a tangent slope of the first biconcave section where the first light-exit concave surface is connected to the light-exit shared surface. A tangent slope of the shared section where the light-exit shared surface is connected to the second light-exit concave surface is larger than a tangent slope of the second biconcave section where the second light-exit concave surface is connected to the light-exit shared surface. The at least one first light source is aligned with the lens. Light emitted by the at least one first light source is incident into the first biconcave section and the shared section via the first light-entrance concave surface and is emitted out of the first light-exit concave surface and the light-exit shared surface. The at least one second light source is disposed adjacent to the at least one first light source. The at least one second light source is aligned with the lens. Light emitted by the at least one second light source is incident into the second biconcave section and the shared section via the second light-entrance concave surface and is emitted out of the second light-exit concave surface and the light-exit shared surface.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
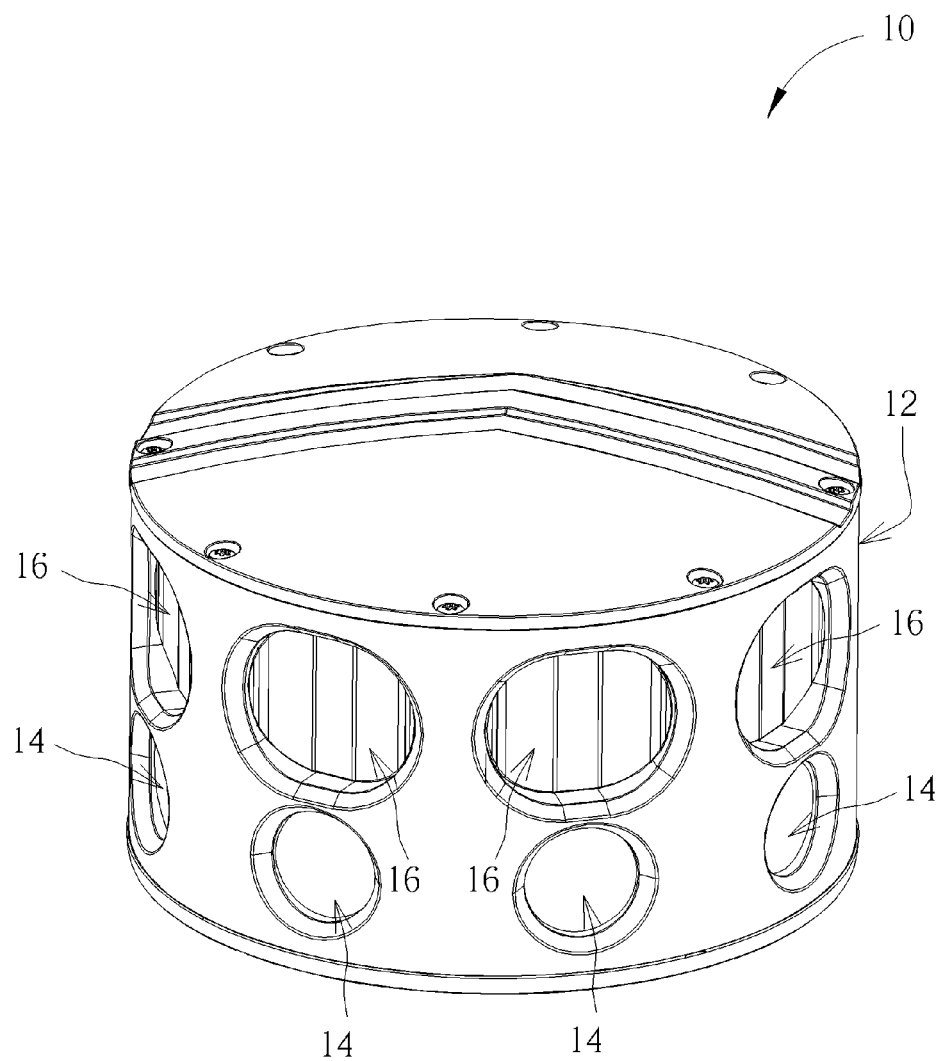
FIG. 1 is a diagram of an image surveillance device according to an embodiment of the present invention.

Please refer to FIG. 1, which is a diagram of an image surveillance device 10 according to an embodiment of the present invention. As shown in FIG. 1, the image surveillance device 10 includes a casing 12, at least one lens module 14 (four shown in FIG. 1, but not limited thereto), and at least one light emitting module 16 (four shown in FIG. 1, but not limited thereto). That is, the image surveillance device 10 could be preferably a surveillance camera with plural lens modules, but not limited thereto. The lens module 14 is disposed in the casing 12 for capturing images. To be more specific, in this embodiment, the lens module 14 could be preferably located above or under the light emitting module 12 (as shown in FIG. 1) in a vertical arrangement, so as to reduce the overall volume of the image surveillance device 10.

Figure 2:
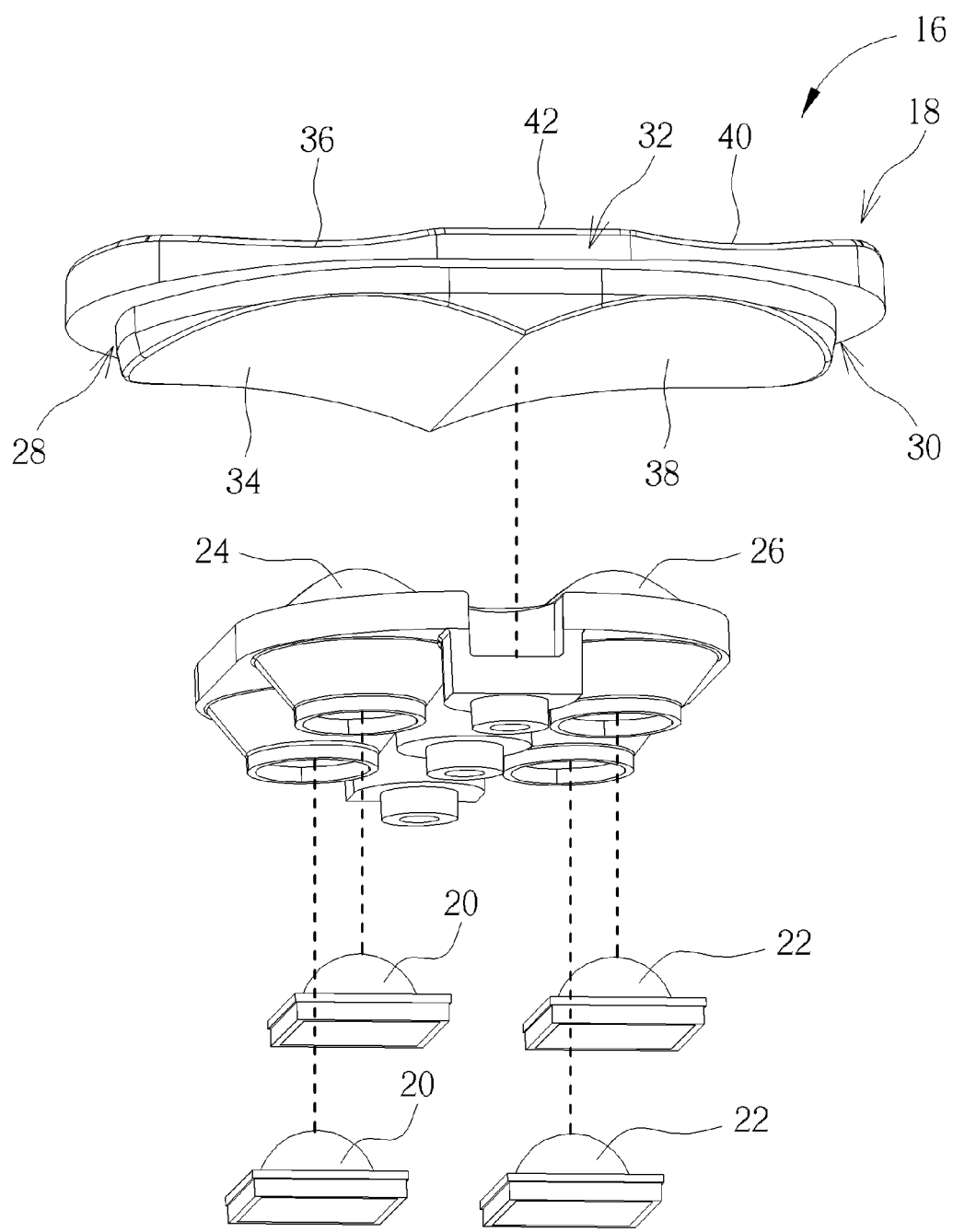
FIG. 2 is an exploded diagram of a light emitting module in FIG. 1.
Figure 3:
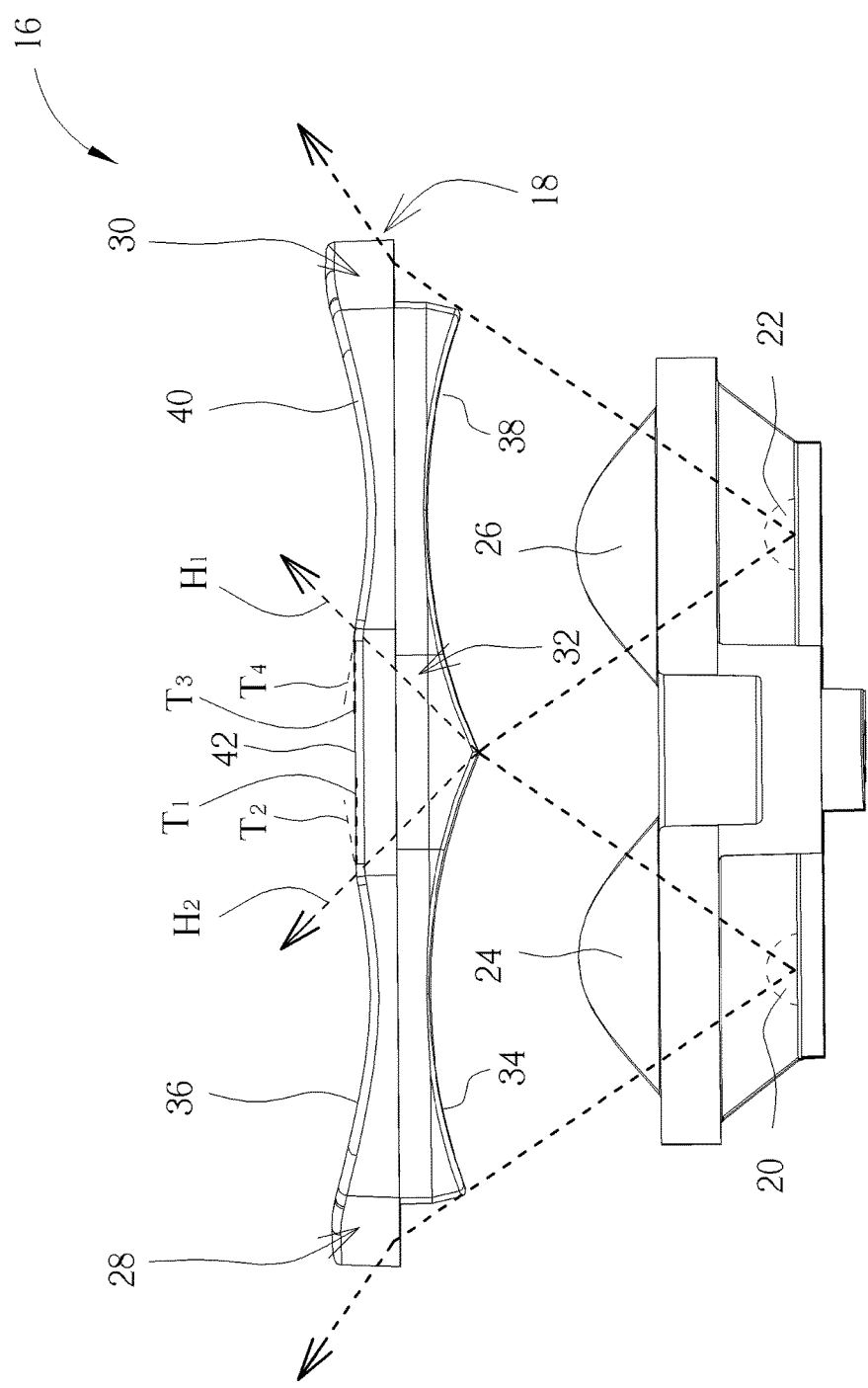
FIG. 3 is a top view of the light emitting module in FIG. 1.

Please refer to FIG. 1, FIG. 2, and FIG. 3. FIG. 2 is an exploded diagram of the light emitting module 16 in FIG. 1. FIG. 3 is a top view of the light emitting module 16 in FIG. 1. As shown in FIG. 1, FIG. 2, and FIG. 3, the light emitting module 16 is disposed in the casing and is adjacent to the lens module 14 for providing light to the lens module 14 when the lens module 14 captures images. The light emitting module 16 includes a lens 18, at least one first light source 20 (two shown in FIG. 2, but not limited thereto), at least one second light source 22 (two shown in FIG. 2, but not limited thereto), a first light focusing unit 24, and a second light focusing unit 26. The lens 18 includes a first biconcave section 28, a second biconcave section 30, and a shared section 32. The first biconcave section 28 has a first light-entrance concave surface 34 and a first light-exit concave surface 36. The second biconcave section 30 has a second light-entrance concave surface 38 and a second light-exit concave surface 40. The shared section 32 is connected to the first biconcave section 28 and the second biconcave section 30 and has a light-exit shared surface 42. The second light-entrance concave surface 38 extends from the first light-entrance concave surface 34. In such a manner, via the design that the first biconcave section 28 is connected to the second biconcave section 30 via the shared section 32, the present invention could efficiently reduce the internal space occupied by the light emitting module 16, so as to be advantageous to the thinning design of the image surveillance device 10. Furthermore, in practical application, the lens 18 could extend vertically for receiving light emitted by the two (or more) first light sources 20 and the two (or more) second light sources 22.

In this embodiment, the light-exit shared surface 42 could be a planar surface. That is, as shown in FIG. 3, a tangent slope $T_1$ (=0) of the shared section 32 where the light-exit shared surface 42 is connected to the first light-exit concave surface 36 is less than a tangent slope $T_2$ (>0) of the first biconcave section 28 where the first light-exit concave surface 36 is connected to the light-exit shared surface 42, and a tangent slope $T_3$ (=0) of the shared section 32 where the light-exit shared surface 42 is connected to the second light-exit concave surface 40 is larger than a tangent slope $T_4$ (<0) of the second biconcave section 30 where the second light-exit concave surface 40 is connected to the light-exit shared surface 42. To be noted, in practical application, a size of the light-exit shared surface 42 of the shared section 32 could be preferably defined by rim light of the first light source 20 and the second light source 22. For example, as shown in FIG. 3, a travelling path of a horizontal rim light $H_1$ of the light emitted by the first light source 20 and a travelling path of a horizontal rim light $H_2$ of the light emitted by the second light source 22 could cooperatively define a width of the light-exit shared surface 42 of the shared section 32, but not limited thereto, meaning that the size of the light-exit shared surface 42 of the shared section 32 could vary according to the practical application of the light emitting module 16.

The first light source 20 and the second light source 22 could be preferably an infrared light emitting diode (but not limited thereto, meaning that the first light source 20 and the second light source 22 could be other type of light emitting diode, such as a visible light emitting diode). The first light source 20 is aligned with the first light-entrance concave surface 34. The second light source 22 is disposed adjacent to the first light source 20 and is aligned with the second light-entrance concave surface 38. The first light focusing unit 24 is disposed between the first light source 20 and the first biconcave section 28, and the second light focusing unit 26 is disposed between the second light source 22 and the second biconcave section 30, so as to focus the light emitted by the first light source 20 and the second light source 22. In this embodiment, the first light focusing unit 24 and the second light focusing unit 26 could be a TIR (Total Internal Reflection) lens, but not limited thereto, meaning that the first light focusing unit 24 and the second light focusing unit 26 could be other optical unit with a light focusing function (e.g. a reflection lamp cup or a convex lens) in another embodiment. To be noted, the first light focusing unit 24 and the second light focusing unit 26 could be omissible components so as to simplify the design of the light emitting module 16. Moreover, amount of the first light source 20, the second light source 22, the first light focusing unit 24, and the second light focusing unit 26 is not limited to the aforesaid embodiment, meaning that it could vary according to the practical application of the light emitting module 16.

Via the aforesaid design, after the light emitted by the first light source 20 and the second light source 22 is focused by the first light focusing unit 24 and the second light focusing unit 26, the light emitted by the first light source 20 could be incident into the first biconcave section 28 and the shared section 32 via the first light-entrance concave surface 34 and emitted out of the first light-exit concave surface 36 and the light-exit shared surface 42, and the light emitted by the second light source 22 could be incident into the second biconcave section 30 and the shared section 32 via the second light-entrance concave surface 38 and emitted out of the second light-exit concave surface 40 and the light-exit shared surface 42. During the aforesaid process, since the tangent slope $T_1$ of the shared section 32 is less than the tangent slope $T_2$ of the first biconcave section 28 and the tangent slope $T_3$ of the shared section 32 is larger than the tangent slope $T_4$ of the second biconcave section 30, light passing through the first light-exit concave surface 36, the second light-exit concave surface 40 and the light-exit shared surface 42 could be focused instead of being diverged, so that there could be more light to pass through a light intersection region of the first light source 20 and the second light source 22. Accordingly, the brightness of the light intersection region of the first light source 20 and the second light source 22 could be increased, so as to solve the aforesaid dark band problem. In such a manner, the light emitting module of the present invention could provide light with uniform brightness, so as to improve the image capturing quality of the image surveillance device.

Figure 4:
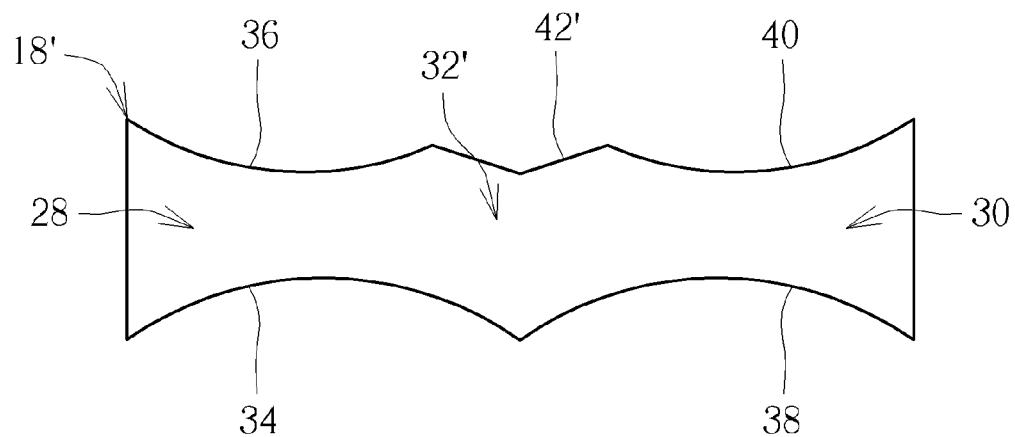
FIG. 4 is a diagram of a lens according to another embodiment of the present invention.
Figure 5:
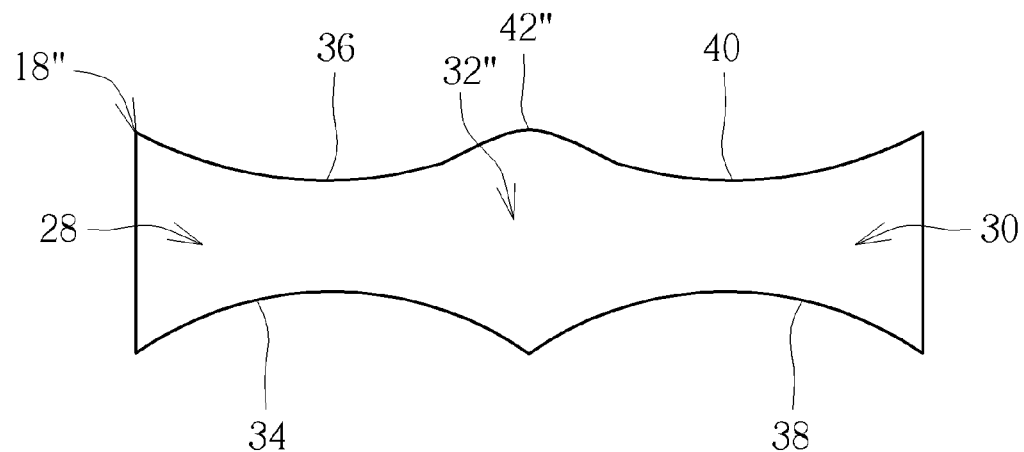
FIG. 5 is a diagram of a lens according to another embodiment of the present invention.
Figure 6:
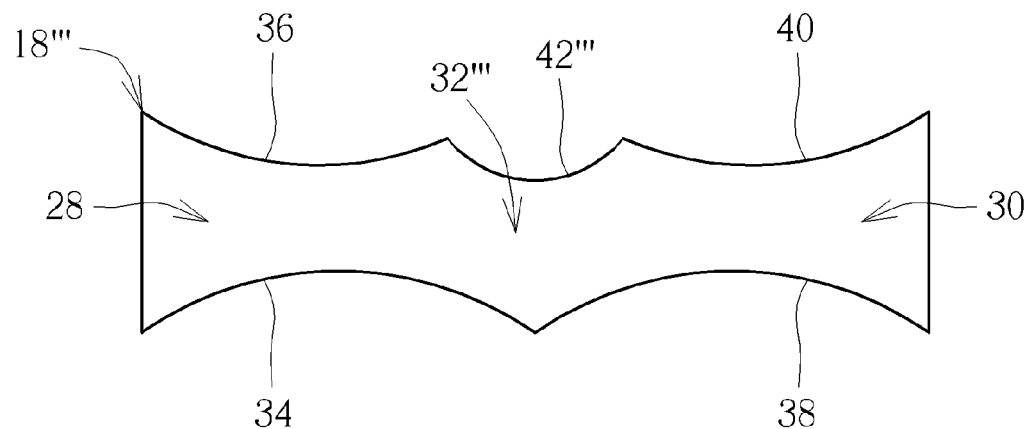
FIG. 6 is a diagram of a lens according to another embodiment of the present invention.

It should be mentioned that the light exit surface design of the shared section is not limited to the aforesaid embodiment. That is to say, all the designs in which a tangent slope of the shared section where the light-exit shared surface is connected to the first light-exit concave surface is less than a tangent slope of the first biconcave section where the first light-exit concave surface is connected to the light-exit shared surface and a tangent slope of the shared section where the light-exit shared surface is connected to the second light-exit concave surface is larger than a tangent slope of the second biconcave section where the second light-exit concave surface is connected to the light-exit shared surface for focusing light passing through the light-exit shared surface, may fall within the scope of the present invention. For example, in another embodiment, as shown in FIG. 4, a light-exit shared surface 42' of a shared section 32' of a lens 18' could be a concave bending surface. In another embodiment, as shown in FIG. 5, a light-exit shared surface 42" of a shared section 32" of a lens 18" could be a convex arc-shaped surface. In another embodiment, as shown in FIG. 6, a light-exit shared surface 42''' of a shared section 32''' of a lens 18''' could be a concave arc-shaped surface. As for the related description for the lenses 18', 18", 18''' and other derived embodiments, it could be reasoned by analogy according to the aforesaid embodiment and omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light emitting module comprising:
    a lens comprising:
        a first biconcave section having a first light-entrance concave surface and a first light-exit concave surface;
        a second biconcave section having a second light-entrance concave surface and a second light-exit concave surface; and
        a shared section connected to the first biconcave section and the second biconcave section, the shared section having a light-exit shared surface connecting the first light-exit concave surface and the second light-exit concave surface, a tangent slope of the shared section where the light-exit shared surface is connected to the first light-exit concave surface being less than a tangent slope of the first biconcave section where the first light-exit concave surface is connected to the light-exit shared surface, a tangent slope of the shared section where the light-exit shared surface is connected to the second light-exit concave surface being larger than a tangent slope of the second biconcave section where the second light-exit concave surface is connected to the light-exit shared surface;
    at least one first light source aligned with the lens, light emitted by the at least one first light source being incident into the first biconcave section and the shared section via the first light-entrance concave surface and being emitted out of the first light-exit concave surface and the light-exit shared surface; and
    at least one second light source disposed adjacent to the at least one first light source, the at least one second light source being aligned with the lens, light emitted by the at least one second light source being incident into the second biconcave section and the shared section via the second light-entrance concave surface and being emitted out of the second light-exit concave surface and the light-exit shared surface, a travelling path of a horizontal rim light of the light emitted by the at least one first light source and a travelling path of a horizontal rim light of the light emitted by the at least one second light source refracted at a point where the first light-entrance concave surface is intersected with the second light-entrance concave surface cooperatively defining a size of the light-exit shared surface of the shared section.

2. The light emitting module of claim 1, wherein the light-exit shared surface is a planar surface, a concave arc-shaped surface, a concave bending surface, or a convex arc-shaped surface.

3. The light emitting module of claim 1 further comprising:
    a first light focusing unit disposed between the at least one first light source and the first biconcave section for focusing the light emitted by the at least one first light source; and
    a second light focusing unit disposed between the at least one second light source and the second biconcave section for focusing the light emitted by the at least one second light source.

4. An image surveillance device comprising:
    a casing;
    at least one lens module disposed in the casing for capturing images; and
    at least one light emitting module disposed in the casing, the at least one light emitting module being disposed adjacent to the at least one lens module for providing light to the at least one lens module when the at least one lens module captures images, the at least one light emitting module comprising:
    a lens comprising:
        a first biconcave section having a first light-entrance concave surface and a first light-exit concave surface;
        a second biconcave section having a second light-entrance concave surface and a second light-exit concave surface; and
        a shared section connected to the first biconcave section and the second biconcave section, the shared section having a light-exit shared surface connecting the first light-exit concave surface and the second light-exit concave surface, a tangent slope of the shared section where the light-exit shared surface is connected to the first light-exit concave surface being less than a tangent slope of the first biconcave section where the first light-exit concave surface is connected to the light-exit shared surface, a tangent slope of the shared section where the light-exit shared surface is connected to the second light-exit concave surface being larger than a tangent slope of the second biconcave section where the second light-exit concave surface is connected to the light-exit shared surface;
    at least one first light source aligned with the lens, light emitted by the at least one first light source being incident into the first biconcave section and the shared section via the first light-entrance concave surface and being emitted out of the first light-exit concave surface and the light-exit shared surface; and
    at least one second light source disposed adjacent to the at least one first light source, the at least one second light source being aligned with the lens, light emitted by the at least one second light source being incident into the second biconcave section and the shared section via the second light-entrance concave surface and being emitted out of the second light-exit concave surface and the light-exit shared surface, a travelling path of a horizontal rim light of the light emitted by the at least one first light source and a travelling path of a horizontal rim light of the light emitted by the at least one second light source refracted at a point where the first light-entrance concave surface is intersected with the second light-entrance concave surface cooperatively defining a size of the light-exit shared surface of the shared section.

5. The image surveillance device of claim 4, wherein the light-exit shared surface is a planar surface, a concave arc-shaped surface, a concave bending surface, or a convex arc-shaped surface.

6. The image surveillance device of claim 4, wherein the at least one light emitting module further comprises:
   a first light focusing unit disposed between the at least one first light source and the first biconcave section for focusing the light emitted by the at least one first light source; and
   a second light focusing unit disposed between the at least one second light source and the second biconcave section for focusing the light emitted by the at least one second light source.

7. The image surveillance device of claim 4, wherein the at least one light emitting module is located above or under the at least lens module.

* * * * *